United States Patent [19]
Gotoh et al.

[11] Patent Number: 5,684,468
[45] Date of Patent: Nov. 4, 1997

[54] ILLUMINATING DISPLAY DEVICE

[75] Inventors: Masakazu Gotoh; Takeshi Kojima, both of Aichi-ken, Japan

[73] Assignee: Kabushiki Kaisha Tokai Rika Denki Seisakusho, Aichi-ken, Japan

[21] Appl. No.: 364,411

[22] Filed: Dec. 23, 1994

Related U.S. Application Data

[63] Continuation of Ser. No. 890,100, May 29, 1992, abandoned.

[30] Foreign Application Priority Data

May 29, 1991 [JP] Japan ................... 3-125914

[51] Int. Cl.$^6$ ............................................ G08B 5/00
[52] U.S. Cl. ................... 340/815.57; 200/311; 362/26
[58] Field of Search ........................ 200/308, 310, 200/311, 313, 317; 362/26, 32, 339, 85, 351, 308, 311, 80; 340/815.01, 815.04, 815.06, 815.07, 815.13, 815.42, 815.48, 815.49, 815.5, 815.53, 815.54, 815.55, 815.57; 348/32

[56] References Cited

U.S. PATENT DOCUMENTS

| | | |
|---|---|---|
| 4,310,871 | 1/1982 | Adachi ........................ 362/26 |
| 4,385,221 | 5/1983 | Dörfler ........................ 200/313 |
| 4,644,455 | 2/1987 | Inglis et al. .................. 362/339 |
| 4,874,224 | 10/1989 | Gutman et al. ............... 362/29 |
| 5,146,057 | 9/1992 | Hellebuyck et al. .......... 200/313 |
| 5,165,772 | 11/1992 | Wu .............................. 362/26 |

FOREIGN PATENT DOCUMENTS 2262187 10/1990 Japan.

Primary Examiner—Amelia Au
Attorney, Agent, or Firm—Birch, Stewart, Kolasch & Brich, LLP

[57] ABSTRACT

An illuminating display device for limiting the travel direction of beams. This device includes a main body which is transparent; a display layer disposed on the surface of the main body and including a display mark composed of a cut-out section; a reflective layer formed in the cut-out section on the surface of the main body and having a pattern including light beams reflecting parts and light beams transmitting parts respectively scattered thereover; and a light source disposed in the main body. In this construction, the main body includes a refracting medium, disposed in a passage for light beams emitted from the light source, for regulating the direction of beams which travel outside the device by refracting the beams.

10 Claims, 3 Drawing Sheets

ILLUMINATING DISPLAY DEVICE

This application is a continuation, of application Ser. No. 07/890,100 filed on May 29, 1992, now abandoned.

BACKGROUND OF THE INVENTION

1. Field of the Invention

The present invention relates to an illuminating display device having a function of regulating the travel direction of beams emitted by a light source.

2. Description of the Related Art

As a switch-indicating member such as a name plate or an operation means of a switch to be mounted on a dashboard of an automobile, an illuminating display device is used. The illuminating display device allows a driver to recognize a display mark formed on its surface by reflected ambient light reflected on the surface of the display mark in the daytime and by beams which have been emitted by a light source disposed rearward of the display mark and passed through the display mark at night. In order to prevent beams which have Transmitted the display mark from projecting widely therefrom so that the projected beams may be reflected by a front window or a side window to reach a driver's eyes at night, an improved illuminating display device has been proposed. The improved illuminating display device, for example, incorporates a light control film having a function of limiting the travel direction of beams which have passed through the display mark to a driver. The light control film generally consists of a transparent base material containing light absorbing louvers arranged at small intervals. Beams which travel substantially in parallel with each other are capable of passing through the intervals between the louvers.

The present applicant proposed an illuminating display device in Japanese Patent Laid-Open Publication No. 2-262187. As shown in FIG. 1, the configuration of the display device is devised to conform to that of a dashboard 16, the surface of which is curved. The display device comprises a main body 11 having a curved front surface; a display layer 12 formed on the surface of the main body 11; and a light control film 14, disposed inside the main body 11, for limiting the transmission direction of beams. It is to be noted that the interval between the louvers 14a shown in FIG. 1 is greater than the actual one, for simplifying the drawings. The display layer 12 includes a cut-out section 13a the configuration of which corresponds to the configuration of a letter or a figure to be displayed; a reflective layer 13b formed, in the cut-out section 13a, on a front surface of the main body 11, having a pattern including light beam reflecting parts and light beam transmitting parts respectively scattered thereover. The light beam reflecting parts generally comprise a great number of opaque fine dots scattered in correspondence with the cut-out section 13a. Thus, the ambient light, in the daytime, is reflected on the fine dots of the reflective layer 13b. On the contrary, the beams emitted by the light source pass through between the adjacent dots. Illuminating display devices having the reflective layer 13b in a fine stripe-pattern or a fine lattice-pattern are also known.

According to this construction, when the light source disposed rearward of the display mark 13 is turned on, beams travel in various directions from the right to the left of FIG. 1 through a light guide 15 consisting of transparent resin. But the light control film 14 makes beams which have passed through the light guide 15 substantially parallel with each other. Then, beams pass through between the adjacent dots of the reflective layer 13b, thus reaching the driver's eyes.

If a thin metal layer is provided on the back surface of the dots of the reflective layer 13b so as to completely prevent beams, which reach the back surface of the dots, from passing therethrough, the beams are substantially completely reflected by the metal layer and return to the light source side. Even if the metal layer is not provided, some beams, which reach the back surface of the dots, are partially reflected or scattered, thus returning to the light source side. As a result, the reflected or scattered beams are re-reflected or re-scattered on the surface of the light control film 14 or the like, thus causing a problem that beams travel in various or undesired directions. This problem occurs even in an illuminating display device having a flat surface.

SUMMARY OF THE INVENTION

It is an object of the present invention to provide an illuminating display device capable of limiting the travel direction of beams to a predetermined direction.

In accomplishing this and other objects, there is provided an illuminating display device for limiting the travel direction of beams comprising: a main body which is transparent; a display layer disposed on a surface of the main body and including a display mark composed of a cut-out section; a reflective layer formed, in the cut-out section, on a front surface of the main body and having a pattern including light beam reflecting parts and light beam transmitting parts respectively scattered thereover; and a light source disposed in the main body. In this construction, the main body includes a refracting medium, disposed in a passage for light beams emitted from the light source, for regulating the travel direction of the beams which are incident thereon by refracting the beam. The reflective layer may be formed in dot-pattern, striped-pattern, lattice-pattern or the like. In order to completely prevent beams from transmitting through the light beam reflecting parts, a thin layer, for example, a metal layer may be provided on the back surface thereof in a condition that the light beam transmitting parts still remain.

According to the above-described construction, upon emission of beams from the light source disposed inside the main body of the illuminating display device, beams are refracted by the refracting medium, thus passing through the light beam transmitting parts of the reflective layer of the display mark. Then, beams progress outside the device. Beams which have passed through the display mark do not necessarily travel in parallel with each other unlike the conventional art but travel in a limited range. When the device is used as a switch-indicating member to be installed on a dashboard of an automobile, the configuration of the refracting medium is determined so that beams do not travel toward a window such as a front window or a side window. Thus beams which have passed through the display mark are not reflected by the window.

Beams which have reached the light beam reflecting parts or the metal layer formed on the back surface thereof are reflected thereby toward the light source. Even though beams are scattered or reflected by a light guide or the like, they are refracted by the refracting medium again before they travel outside from the display mark. Therefore, they do not travel out of a predetermined range.

Preferably, a transparent protective layer is formed on the surface of the display layer to cover the display mark. Thus, the protective film is capable of preventing the display mark from being worn substantially without affecting the traveling range of beams. Owing to this construction, the illuminating display device regulates the travel direction of beams and is durable.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
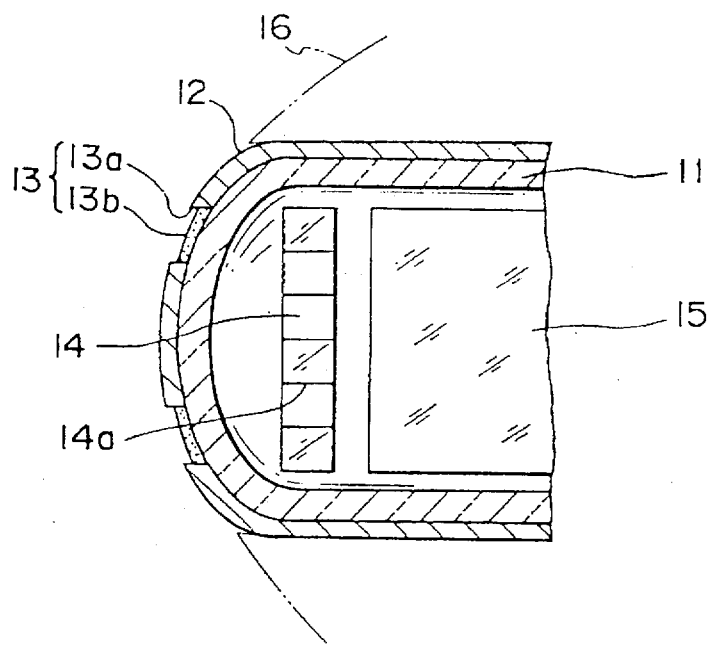
FIG. 1 is a sectional view showing a conventional illuminating display device, as previously described.

Before the description of the present invention proceeds, it is to be noted that like parts are designated by like reference numerals throughout the accompanying drawings.

Figure 2:
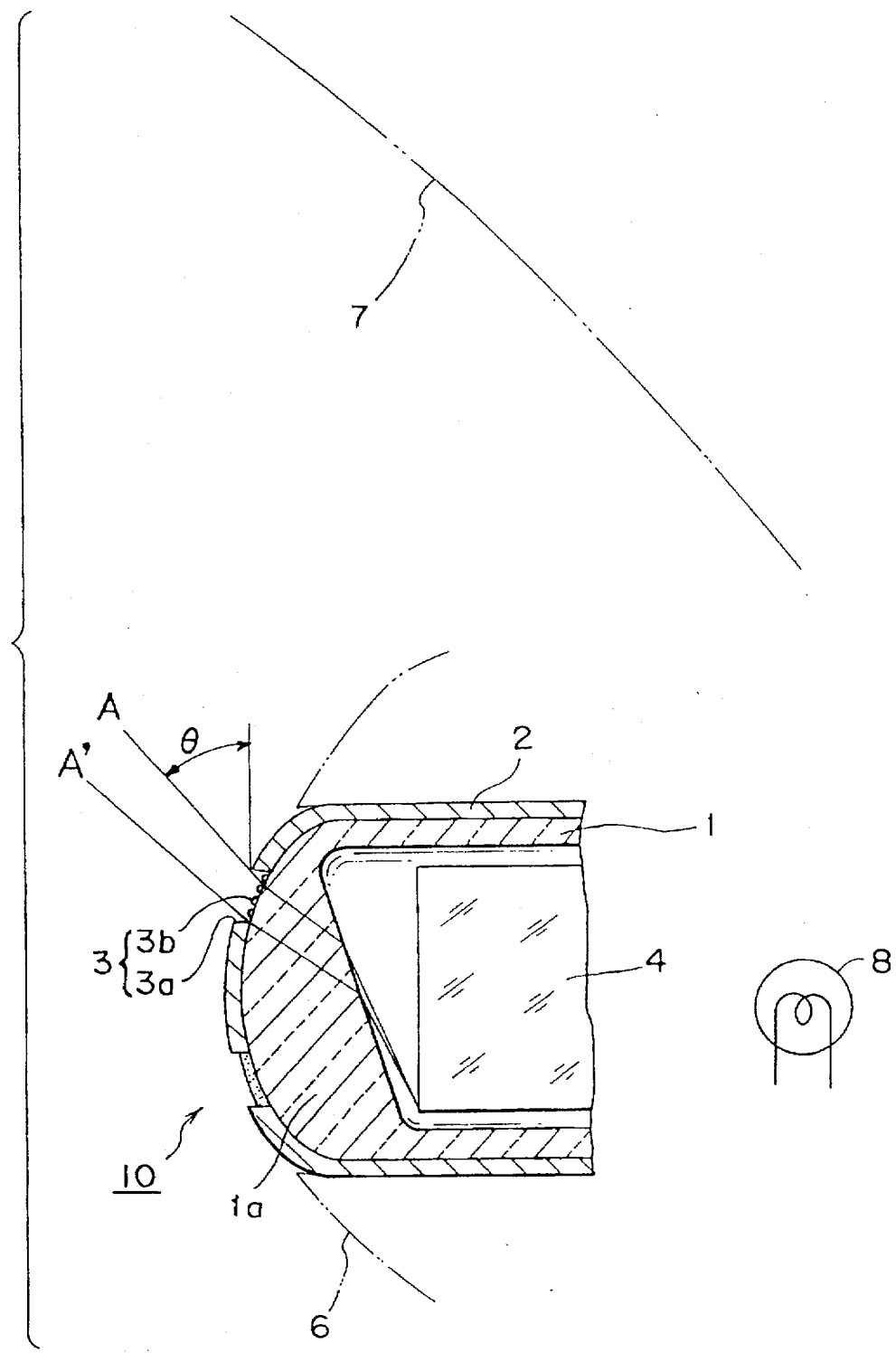
FIG. 2 is a sectional view showing an illuminating display device according to a first embodiment of the present invention.

An illuminating display device according to a first embodiment of the present invention will be described below with reference to FIG. 2 which is a sectional view showing the illuminating display device 10 serving as an operation member of a switch to be mounted on a dashboard 6 of an automobile. The illuminating display device 10 comprises a main body 1 consisting of transparent synthetic resin; and a display layer 2 formed on the surface of the main body 1. The display layer 2 includes a display mark 3 comprising a cut-out section 3a in the configuration of a letter or a figure to be displayed; and a reflective layer 3b formed, in the cut-out section 3a, on the surface of the main body 1 and having a pattern including light beam reflecting parts 3c and light beam transmitting parts 3d respectively scattered thereover. The light beam reflecting parts 3c consist of a large number of fine reflective dots scattered on the surface of the main body 1. The reflective dots are shown detail in FIG. 2a. A refracting medium 1a for regulating the travel direction of beams by refracting the beams which are incident thereon is formed in a region of the main body 1 through which they are required to pass, namely, the region on which the display mark 3 is formed. A light guide 4 and a light source 8 are disposed rearward of the refracting medium 1a. Reference numeral 7 denotes a front window of the automobile.

In the illuminating display device 10 of the above construction, beams emitted by the light source 8 disposed rearward of the light guide 4 advance in various directions in the light guide 4 and are then refracted by the refracting medium 1a. For example, beams which have passed through the lower end of the light guide 4 transmit the display mark 3 in the range between A and A'. Beams which have left the light guide 4 from any position above the lower end thereof are refracted by the refracting medium 1a to travel below the line shown by A. Accordingly, by forming the prism la so that the line A making an angle of Θ with a vertical line of FIG. 2 does not reach the front window 7, beam which have passed through the light beams transmitting parts 3d of the reflective layer 3b are prevented from reflection on the front window 7. Some beams are reflected by the light beam reflecting parts 3c or the metal layer 3e which may be formed on the back surface thereof, thus progressing toward the light guide 4. Even though they are reflected in various directions on the surface of the light guide 4, they are refracted by the refracting medium 1a again and transmit the display mark 3 at an angle greater than Θ.

The above-described construction prevents beams from reaching the range unrequired to be illuminated. In addition, since a light control film is not installed in the illuminating display device of the first embodiment unlike the conventional art, time and labor can be saved. The surface of the main body of the illuminating display device is curved in the first embodiment, but may be formed in various configurations. For example, the surface of the main body may be flat.

Figure 3:
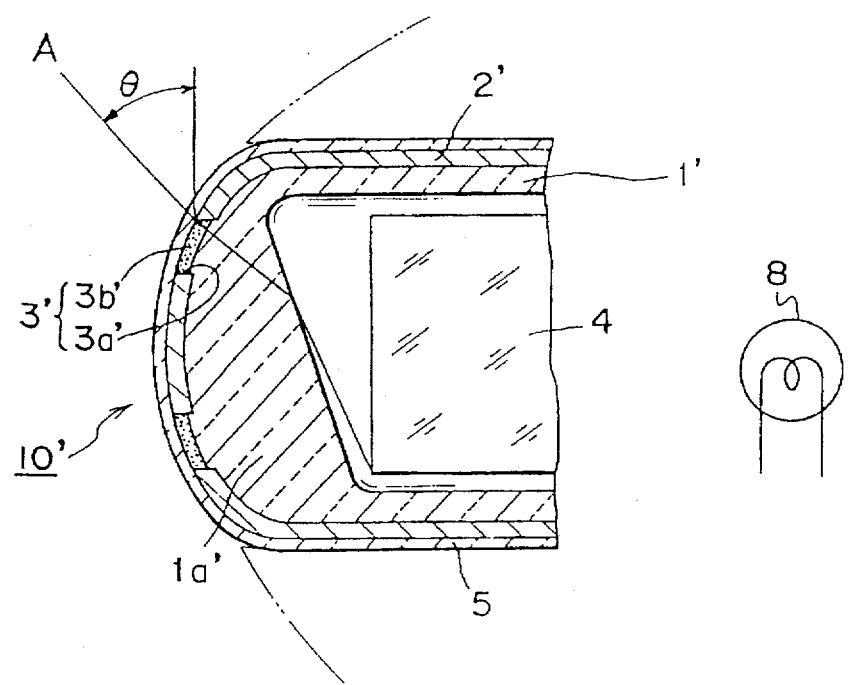
FIG. 3 is a sectional view showing an illuminating display device according to a second embodiment of the present invention.
Figure 2A:
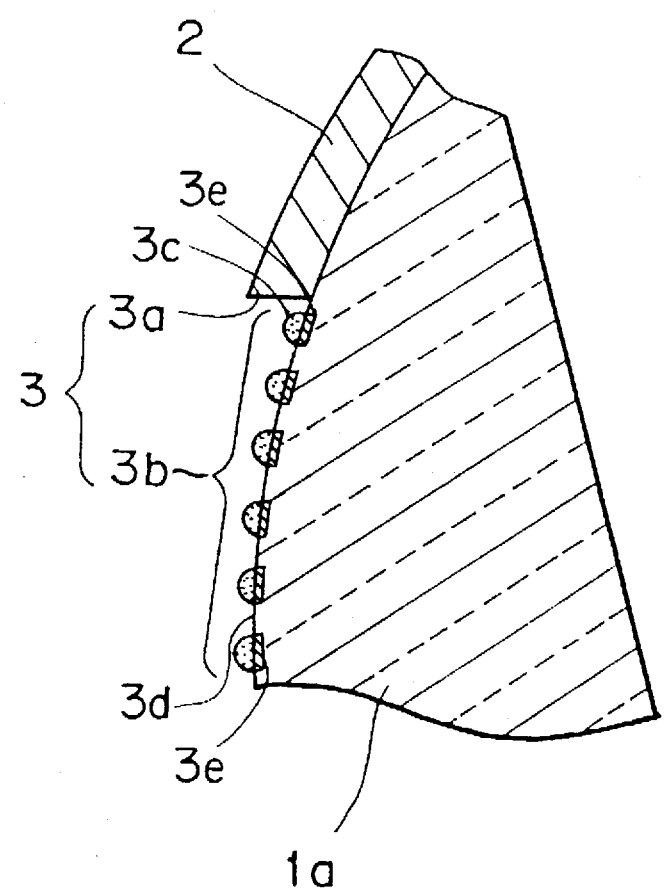
FIG. 2a shows in greater detail the cut-out section of the light beam reflecting parts and a metal layer on the back thereof.

An illuminating display device 10' according to a second embodiment of the present invention is described below with reference to FIG. 3. Similarly to the illuminating display device 10 according to the first embodiment, the illuminating display device 10' comprises a transparent main body 1' including a refracting medium 1a; a display layer 2' including a display mark 3' comprising a cut-out section 3a'; and a reflective layer 3b' consisting of light beams reflecting parts 3c' and light beam transmitting parts 3d' of constrution as shown in FIG. 2a. The display device 10' further comprises a transparent film 5, disposed on the surface of the display layer 2', consisting of polycarbonate or polyester for protecting the display mark 3'.

The illuminating display device 10' is manufactured by the following method: That is, first, the light-intercepting display layer 2' is formed by printing on a surface of the transparent film 5. In this process, a region having the configuration of a letter or a figure which is to be displayed is not printed to form the cut-out section 3a'. The printed region on the transparent film 5 is used as the background of the display mark 3'. Then, a large number of fine reflective dots are scatteringly formed in the cut-out section 3a' by silk screen printing, gravure printing, offset printing, relief printing or the like to make the reflective layer. Thereafter, the film 5 is placed in the cavity of a die for molding the main body 1' having the refracting medium 1a' integrated therewith in such a manner that the display layer 2' is opposed to resin to be molded. Then, injection molding of transparent resin is carried out to integrate the main body 1', the display layer 2', and the protective film 5 with each other. Finally, the light guide 4 and a light source 8 are then installed inside the main body 1'.

According to the above illuminating display device, similarly to the first embodiment, beams are refracted by the refracting medium 1a' and then pass through the light beam transmitting parts 3d' of the reflective layer at an angle greater than Θ. Some beams are reflected by the back surface of the light beam reflecting parts of the reflective layer 3b' and travel toward the light source 8, and they are reflected in various directions by the light guide 4. However, they are refracted by the refracting medium 1a' again, the illuminating display device 10' is capable of regulating the travel direction of beams. In addition, the protective film 5 prevents the display mark 3' from being worn. Hence, the device is durable.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An illuminating display device comprising:

a main body which is transparent;

a display layer disposed in surface contact with said main body and including a display mark including a cut-out section and a reflective layer formed, in said cut-out section, on a front surface of said main body, said reflective layer having a pattern including light beam reflecting parts and light beam transmitting parts, respectively scattered thereover, a thin metal layer being formed between and in surface contact with both said main body and a rear surface of the light beam reflecting parts of said reflective layer; and a light source disposed in said main body, wherein said main body includes a refracting medium disposed in a passage for light beams emitted from said light source, for regulating the travel direction of the beams which are incident thereon by refracting the beams and wherein said thin metal layer completely reflects light beams directed at the rear surface of the light beam reflecting parts of said reflective layer.

2. The illuminating display device as claimed in claim 1, wherein said main body constitutes a switch-indicating member to be mounted on a dashboard of an automobile; and said refracting medium regulates the travel direction of the beams so that the beams are prevented from traveling toward a window of the automobile.

3. The illuminating display device as claimed in claim 1, wherein a transparent protective layer is formed close on the surface of said display layer to cover said display mark.

4. The illuminating display device as claimed in claim 1, wherein the travel direction of the beams are refracted within a predetermined angle.

5. The illuminating display device as claimed in claim 1, wherein said refracting medium is of an increasing thickness from an upper side to a lower side as formed on a rear surface of said display layer.

6. An illuminating display device comprising:

a main body which is transparent;

a display layer disposed in surface contact with said main body and including a display mark including a cut-out section and a reflective layer formed, in said cut-out section, on a front surface of said main body, said reflective layer having a pattern including light beam reflecting parts and light beam transmitting parts, respectively scattered thereover, a thin metal layer being formed between and in surface contact with both said main body and a rear surface of at least some of the light beam reflecting parts of said reflective layer; and a light source disposed in said main body, wherein said main body includes a refracting medium disposed in a passage for light beams emitted from said light source, for regulating the travel direction of the beams which are incident thereon by refracting the beams and wherein said thin metal layer completely reflects light beams directed at the rear surface of the light beam reflecting parts of said reflective layer.

7. The illuminating display device as claimed in claim 6, wherein said main body constitutes a switch-indicating member to be mounted on a dashboard of an automobile; and said refracting medium regulates the travel direction of the beams so that the beams are prevented from traveling toward a window of the automobile.

8. The illuminating display device as claimed in claim 6, wherein a transparent protective layer is formed close on the surface of said display layer to cover said display mark.

9. The illuminating display device as claimed in claim 6, wherein the travel direction of the beams are refracted within a predetermined angle.

10. The illuminating display device as claimed in claim 6, wherein said refracting medium is of an increasing thickness from an upper side to a lower side as formed on a rear surface of said display layer.

* * * * *